(No Model.) 2 Sheets—Sheet 1.
W. M. ABBOTT.
VAPOR BURNER.
No. 462,089. Patented Oct. 27, 1891.
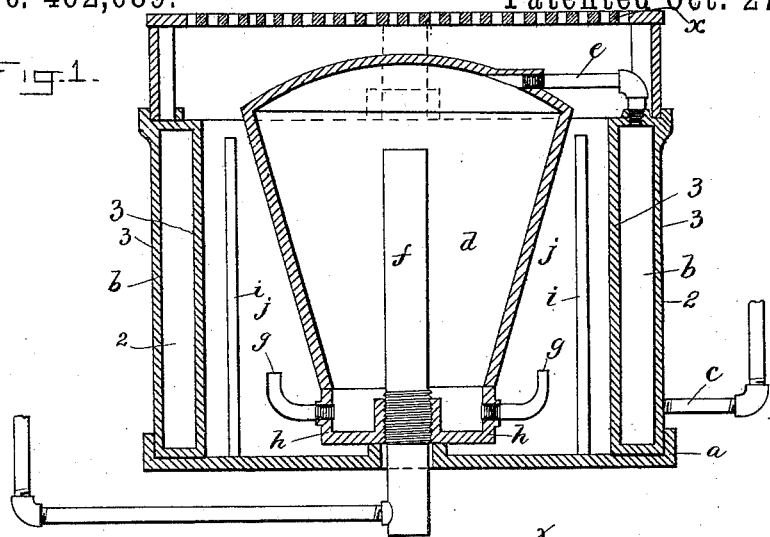
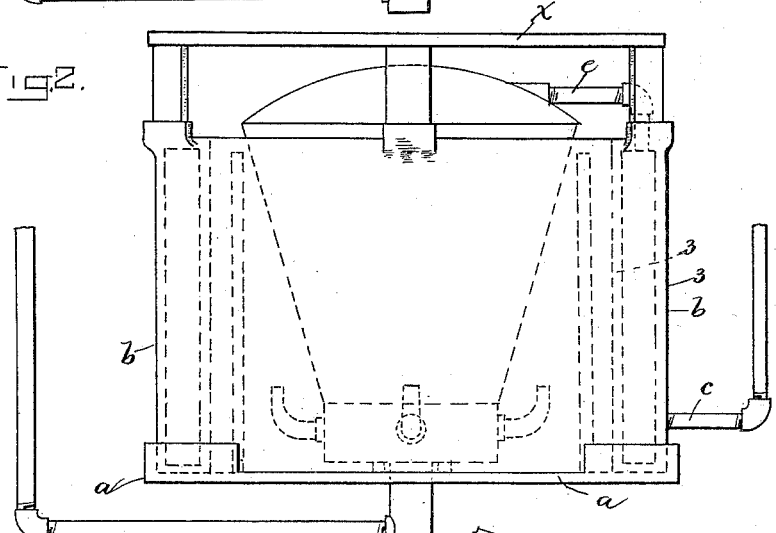
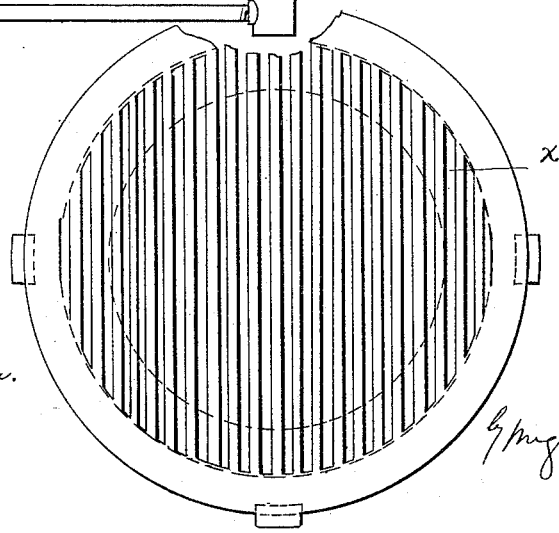
WITNESSES:
INVENTOR:

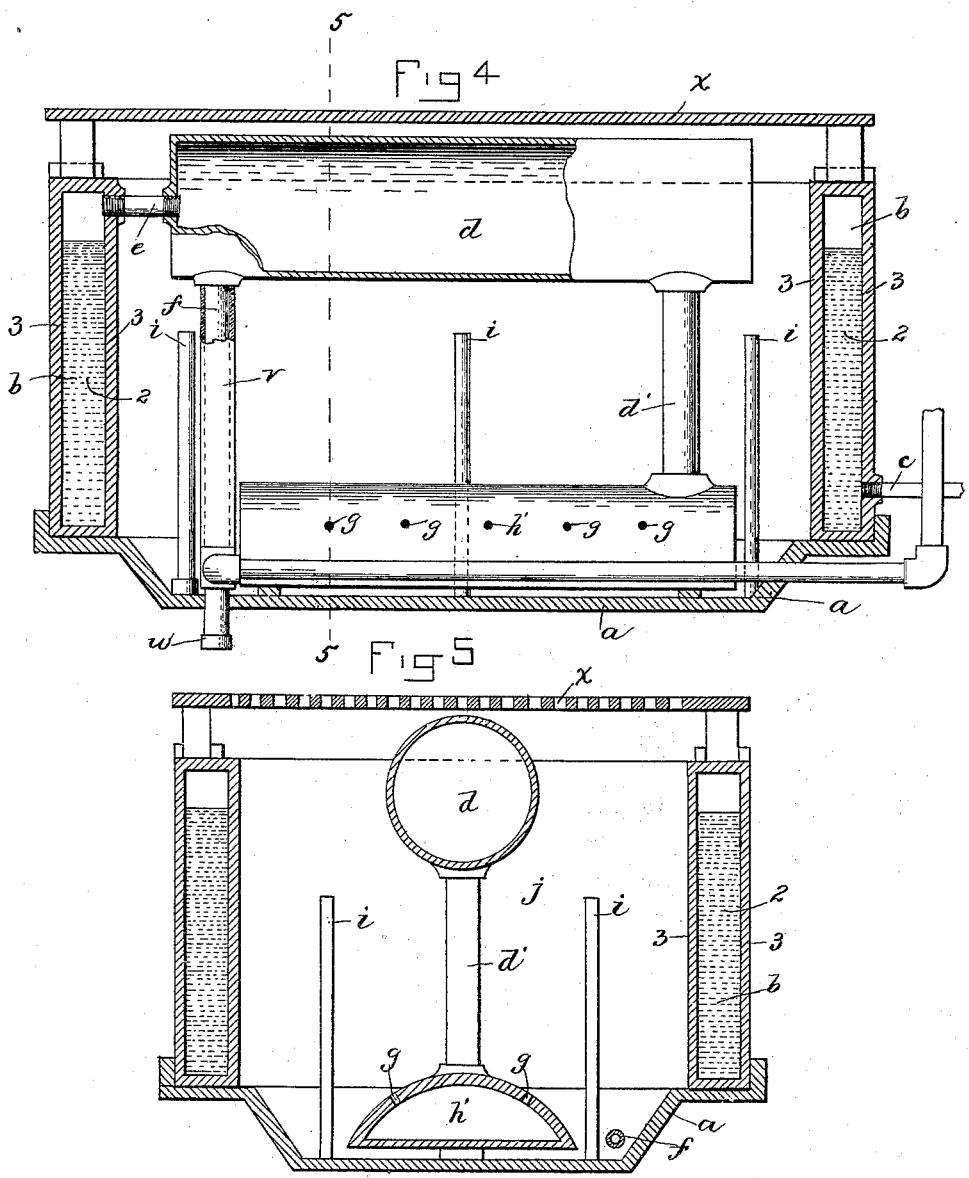

UNITED STATES PATENT OFFICE.

WARREN M. ABBOTT, OF BOSTON, MASSACHUSETTS, ASSIGNOR OF ONE-HALF TO HARVEY K. FLAGLER, OF SAME PLACE.

VAPOR-BURNER.

SPECIFICATION forming part of Letters Patent No. 462,089, dated October 27, 1891.

Application filed July 24, 1890. Serial No. 359,720. (No model.)

*To all whom it may concern:*

Be it known that I, WARREN M. ABBOTT, of Boston, in the county of Suffolk and State of Massachusetts, have invented certain new and useful Improvements in Vapor-Burners, of which the following is a specification.

This invention has for its object to provide an improved burner or apparatus for vaporizing liquid fuel—such as the hydrocarbon oils—and for burning said fuel in a gaseous form, together with oxygen and hydrogen produced by the decomposition of water.

The invention consists in the improved burner, which I will now proceed to describe and claim.

Of the accompanying drawings, forming a part of this specification, Figure 1 represents a vertical central section of my improved burner. Fig. 2 represents a side elevation of the same. Fig. 3 represents a top view. Fig. 4 represents a sectional view of a burner of different form embodying my improvements. Fig. 5 represents a section on line 5 5, Fig. 4.

The same letters and numerals of reference indicate the same parts in all the figures.

In carrying out my invention I provide a pan or base $a$, which in the form of the apparatus shown in Figs. 1, 2, and 3 is circular and in the form shown in Figs. 4 and 5 is rectangular. On the margin of said pan is a double-walled casing or tank $b$, which surrounds the space over the pan and has a water-space 2 between its walls 3 3, said space receiving water from a suitable source of supply through a pipe $c$.

$d$ represents a mixing-chamber located in the space surrounded by the hollow wall or tank $b$, said chamber being connected with the tank by one or more pipes $e$, so that it receives steam from said tank, as hereinafter described.

$f$ represents an oil-supply pipe, which admits oil to the mixing-chamber, where the oil is vaporized and the resulting carbon and other gases mingled with the hydrogen and oxygen set free by the decomposition of water in the tank.

$g\ g$ represent burners connected with the mixing-chamber and arranged to heat the latter as well as the inner surface of the tank $b$ for the purpose of generating the steam and vaporizing the oil.

In the form shown in Figs. 1, 2, and 3 the burners are attached to a pan or cup $h$, which forms the base or lower portion of the mixing-chamber, while in the form shown in Figs. 4 and 5 the burners are on a casing or chamber $h'$, which is connected with the mixing-chamber by a tube $d'$, the burners in both cases being arranged in the combustion-chamber or space $j$, which is surrounded by the tank $b$ and contains the mixing-chamber.

$i\ i$ represent air-inlets, which enter the combustion-chamber and supply air thereto.

The operation is as follows: Oil is admitted to the mixing-chamber $d$, and before the latter is heated flows directly to the burners $g\ g$, where it is ignited. The flames from the burners soon heat the mixing-chamber and the tank sufficiently to vaporize the oil in the mixing-chamber and generate steam in the tank. The resulting gases and vapors are mingled in the mixing-chamber and pass to the burners, where they are consumed and continuously heat the tank and mixing-chamber, so that the conversion of the oil in the mixing-chamber and the water in the tank into a gaseous fuel goes on continuously after it has been commenced, as above described. The mixture of carbon, hydrogen, oxygen, and other gases produced by the operation of my improved burner burns with intense heat, which is economically produced.

To insure perfect combustion and thereby avoid the production of smoke, soot, and unpleasant odors, I prefer to employ a chemical solution in the tank $b$, said solution being similar to that described in the patent of Harvey K. Flagler, No. 439,394, dated October 28, 1890. Said solution when vaporized supplies gaseous elements which cause perfect consumption of the carbon in the liquid fuel and make the combustion odorless and unobjectionable. The apparatus is thus adapted for household use in heating and cooking, although it is not limited to such use, and may be used for steam-generating and other mechanical purposes. A perforated or openwork plate $x$ is preferably placed over the combustion-chamber to support cooking utensils, &c.

$v$ represents a covering, of asbestus or other non-conductor of heat, applied to the oil-supply pipe in the form of apparatus shown in Fig. 4. The object of said covering is to prevent the intense heat to which the oil-supply pipe is subjected in the combustion-chamber from coking the oil within the pipe and thus obstructing the latter.

$w$ represents a removable trap at the lower end of the vertical portion of the oil-supply pipe. Said trap receives accumulations of sediment from the oil and may be readily removed when occasion requires to permit the removal of such accumulations.

I claim—

The combination of the base or pan, the water-tank thereon formed to surround a combustion-chamber over the pan, the mixing-chamber located in said combustion-chamber, said mixing-chamber being also surrounded by and connected with said tank, the oil-supply pipe entering the mixing-chamber, the burners connected with the mixing-chamber and arranged to heat the tank and mixing-chamber, and the air pipes or inlets projecting from said base or pan and arranged to admit air to the combustion-chamber, as set forth.

In testimony whereof I have signed my name to this specification, in the presence of two subscribing witnesses, this 16th day of July, A D. 1890.

WARREN M. ABBOTT.

Witnesses:
C. F. BROWN,
A. D. HARRISON.